United States Patent
Okabayashi

(10) Patent No.: US 11,418,661 B2
(45) Date of Patent: Aug. 16, 2022

(54) COMMUNICATION SYSTEM INCLUDING IMAGE FORMING APPARATUS AND INFORMATION PROCESSING APPARATUS, AND CONFIGURED TO REALIZE LINKAGE BETWEEN CHAT FUNCTION AND USER NOTE FUNCTION

(71) Applicant: KYOCERA Document Solutions Inc., Osaka (JP)

(72) Inventor: Yoshifumi Okabayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/131,816

(22) Filed: Dec. 23, 2020

(65) Prior Publication Data

US 2021/0203795 A1     Jul. 1, 2021

(30) Foreign Application Priority Data

Dec. 26, 2019  (JP) .............................. JP2019-236803

(51) Int. Cl.
    *H04L 12/58*    (2006.01)
    *H04N 1/00*    (2006.01)
    (Continued)

(52) U.S. Cl.
    CPC ....... *H04N 1/00411* (2013.01); *G06F 40/279* (2020.01); *H04L 67/306* (2013.01);
    (Continued)

(58) Field of Classification Search
    CPC ..... H04L 67/306; H04L 67/22; H04L 67/535; H04L 51/10; H04L 51/18; H04N 1/00411;
    (Continued)

(56) References Cited

U.S. PATENT DOCUMENTS

2008/0005239 A1*  1/2008  Podl ....................... G06Q 10/10
    709/204
2014/0355051 A1  12/2014  Nakajima et al.
(Continued)

FOREIGN PATENT DOCUMENTS

JP           2014-235482 A      12/2014

*Primary Examiner* — Jungwon Chang
(74) *Attorney, Agent, or Firm* — IP Business Solutions, LLC

(57) ABSTRACT

A communication system includes an image forming apparatus and an information processing apparatus, and performs data communication using a chat tool. The information processing apparatus includes a first setup unit that causes a first display device to display a chat screen, and a first controller that transmits, when message information is inputted to the chat screen through an operation device, the message information to the image forming apparatus. The image forming apparatus includes a second display device, a communication device, a second setup unit, a storage device including a user note storage region, a storage controller that stores the message information from the information processing apparatus in the user note storage region of the storage device, and a second controller that causes the second display device to display the message information stored in the user note storage region of the storage device.

9 Claims, 13 Drawing Sheets

(51) Int. Cl.
*G06F 40/279* (2020.01)
*H04L 67/306* (2022.01)
*H04L 67/50* (2022.01)
*H04L 51/10* (2022.01)
*H04L 51/18* (2022.01)

(52) U.S. Cl.
CPC ....... *H04L 67/535* (2022.05); *H04N 1/00204* (2013.01); *H04L 51/10* (2013.01); *H04L 51/18* (2013.01)

(58) Field of Classification Search
CPC ........... H04N 1/00217; H04N 1/00244; H04N 1/00204; G06F 3/1292; G06F 3/121; G06F 40/279
See application file for complete search history.

(56) References Cited

U.S. PATENT DOCUMENTS

| | | | |
|---|---|---|---|
| 2015/0172505 A1* | 6/2015 | Park | H04N 1/00244 358/1.15 |
| 2019/0306327 A1* | 10/2019 | Matysiak | G06F 3/121 |
| 2019/0306341 A1* | 10/2019 | Matysiak | G06F 3/1292 |
| 2019/0317709 A1* | 10/2019 | Sugimoto | H04L 51/02 |
| 2021/0160393 A1* | 5/2021 | Sugita | H04N 1/00217 |

* cited by examiner

Fig.7

USER NOTE STORAGE REGION

| STORAGE ADDRESS | MESSAGE INFORMATION | CHAT TYPE (CHAT MEMBER) | USER IDENTIFIED FROM MESSAGE INFORMATION | OBJECT USER | ALREADY-READ FLAG FOR EACH OBJECT USER |
|---|---|---|---|---|---|
| AD0001 | YY SAN, PLEASE HAVE THAT DOCUMENT SCANNED | ONE-TO-ONE CHAT (XX) | YY | YY | OFF |

Fig. 11A

USER NOTE STORAGE REGION

| STORAGE ADDRESS | MESSAGE INFORMATION | CHAT TYPE (CHAT MEMBER) | USER IDENTIFIED FROM MESSAGE INFORMATION | OBJECT USER | ALREADY-READ FLAG FOR EACH OBJECT USER |
|---|---|---|---|---|---|
| AD0002 | SEPTEMBER 10, 10:00AM, GROUP MEETING AT CONFERENCE ROOM 102 | GROUP CHAT (XX, YY, ZZ) | UNIDENTIFIED | XX, YY, ZZ | OFF, OFF, OFF |

Fig. 11B

USER NOTE STORAGE REGION

| STORAGE ADDRESS | MESSAGE INFORMATION | CHAT TYPE (CHAT MEMBER) | USER IDENTIFIED FROM MESSAGE INFORMATION | OBJECT USER | ALREADY-READ FLAG FOR EACH OBJECT USER |
|---|---|---|---|---|---|
| AD0003 | UNUSABLE DUE TO MAINTENANCE, OCTOBER 11, 6:00PM TO 7:00PM | ONE-TO-ONE CHAT (XX) | UNIDENTIFIED | ALL USERS | OFF |

Fig.12
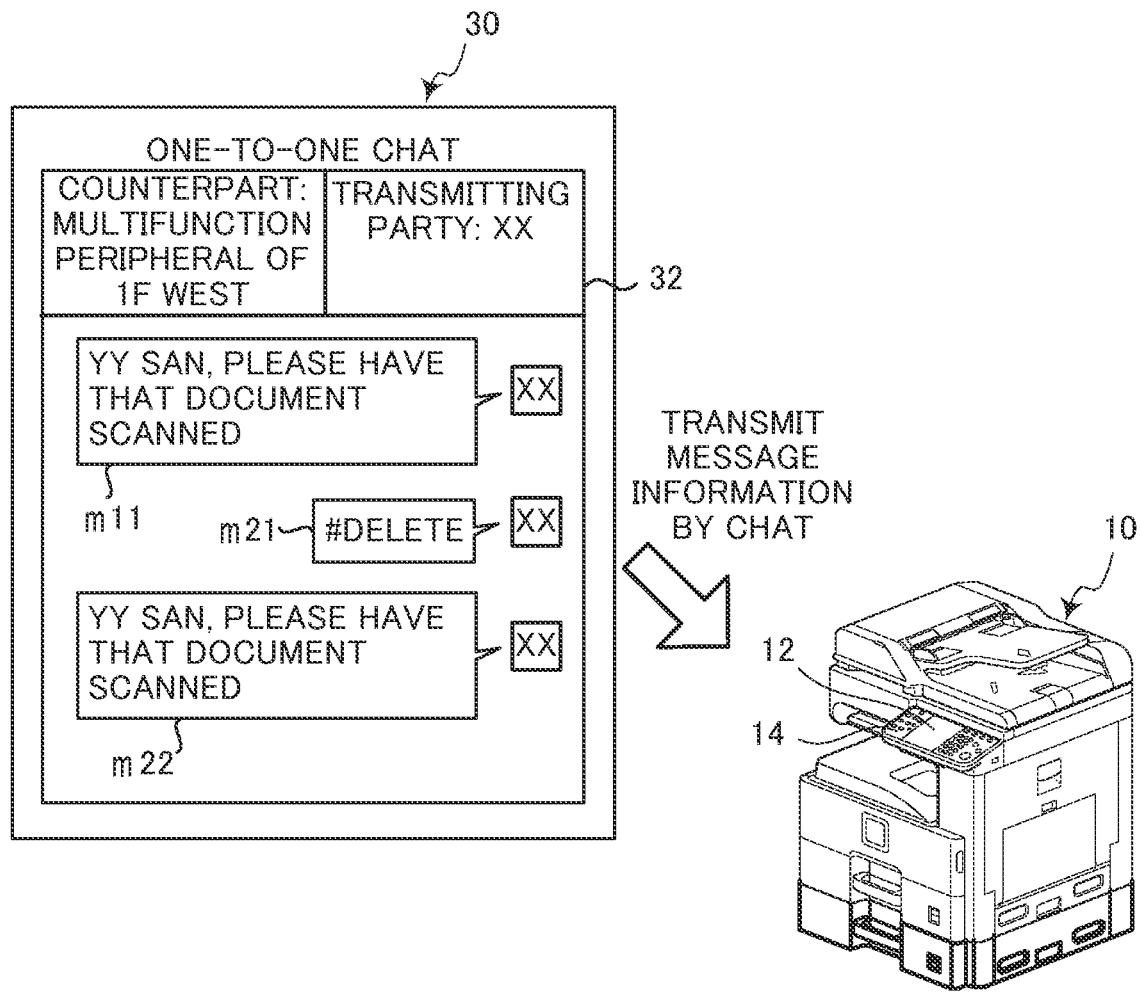
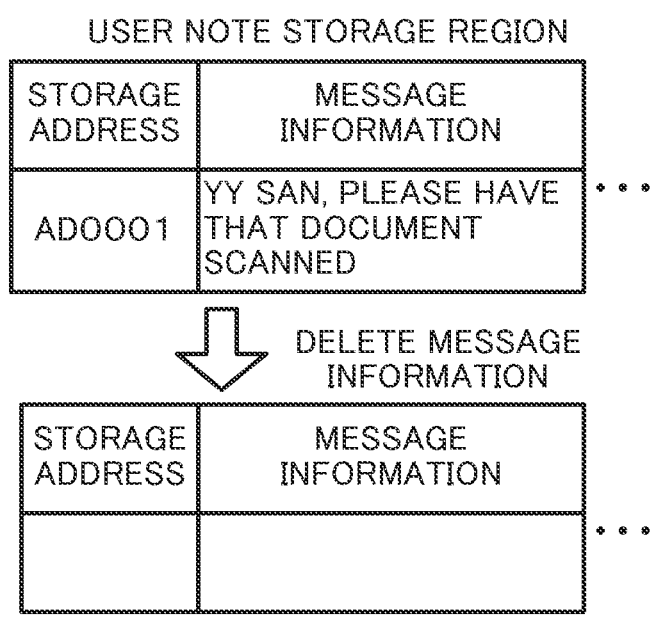

COMMUNICATION SYSTEM INCLUDING IMAGE FORMING APPARATUS AND INFORMATION PROCESSING APPARATUS, AND CONFIGURED TO REALIZE LINKAGE BETWEEN CHAT FUNCTION AND USER NOTE FUNCTION

INCORPORATION BY REFERENCE

This application claims priority to Japanese Patent Application No. 2019-236803 filed on Dec. 26, 2019, the entire contents of which are incorporated by reference herein.

BACKGROUND

The present disclosure relates to a communication system in which an image forming apparatus and an information processing apparatus perform data communication with each other via a network, and in particular to a technique to realize linkage between a chat function and a user note function.

In a known device management system, for example a remote maintenance server on the part of a maintenance service provider and an image forming apparatus on the part of a client are connected via a network, and a maintenance notice from the remote maintenance server is displayed on a display screen of the operation panel of the image forming apparatus, using a user note function (also called a digital note function) provided in the image forming apparatus.

SUMMARY

The disclosure proposes further improvement of the foregoing technique.

In an aspect, the disclosure provides a communication system including an image forming apparatus and an information processing apparatus that perform data communication with each other. The information processing apparatus includes a first display device, an operation device, a first communication device, and a first control device. The operation device is to be operated by a user. The first communication device performs data communication. The first control device includes a processor, and acts as a first setup unit and a first controller, when the processor executes a first control program. The first setup unit establishes a condition that enables chat to be performed, by activating a chat tool, and causes the first display device to display a chat screen including the image forming apparatus as a chat member. The first controller causes the first communication device, when message information is inputted to the chat screen through the operation device, to transmit the inputted message information to the image forming apparatus, via a network. The image forming apparatus includes a second display device, a second communication device, a second setup unit, a storage device, and a second control device. The second communication device performs data communication. The second setup unit establishes a condition that enables the chat to be performed, by activating a chat tool. The storage device includes a user note storage region. The second control device includes a processor, and acts as a storage controller and a second controller, when the processor executes a second control program. The storage controller stores, upon receipt of the message information from the information processing apparatus through the second communication device, the message information in the user note storage region. The second controller causes the second display device to display the message information stored in the user note storage region.

BRIEF DESCRIPTION OF THE DRAWINGS

FIG. 7 shows an example of data stored in a user note storage region.

FIG. 11A and FIG. 11B each show an example of data stored in the user note storage region.

FIG. 12 is a schematic drawing showing an example of a case where a transmitting party instructs to delete the message information on the chat screen, after transmitting the message information.

DETAILED DESCRIPTION

Hereafter, a communication system according to an embodiment of the disclosure will be described, with reference to the drawings.

Figure 1:
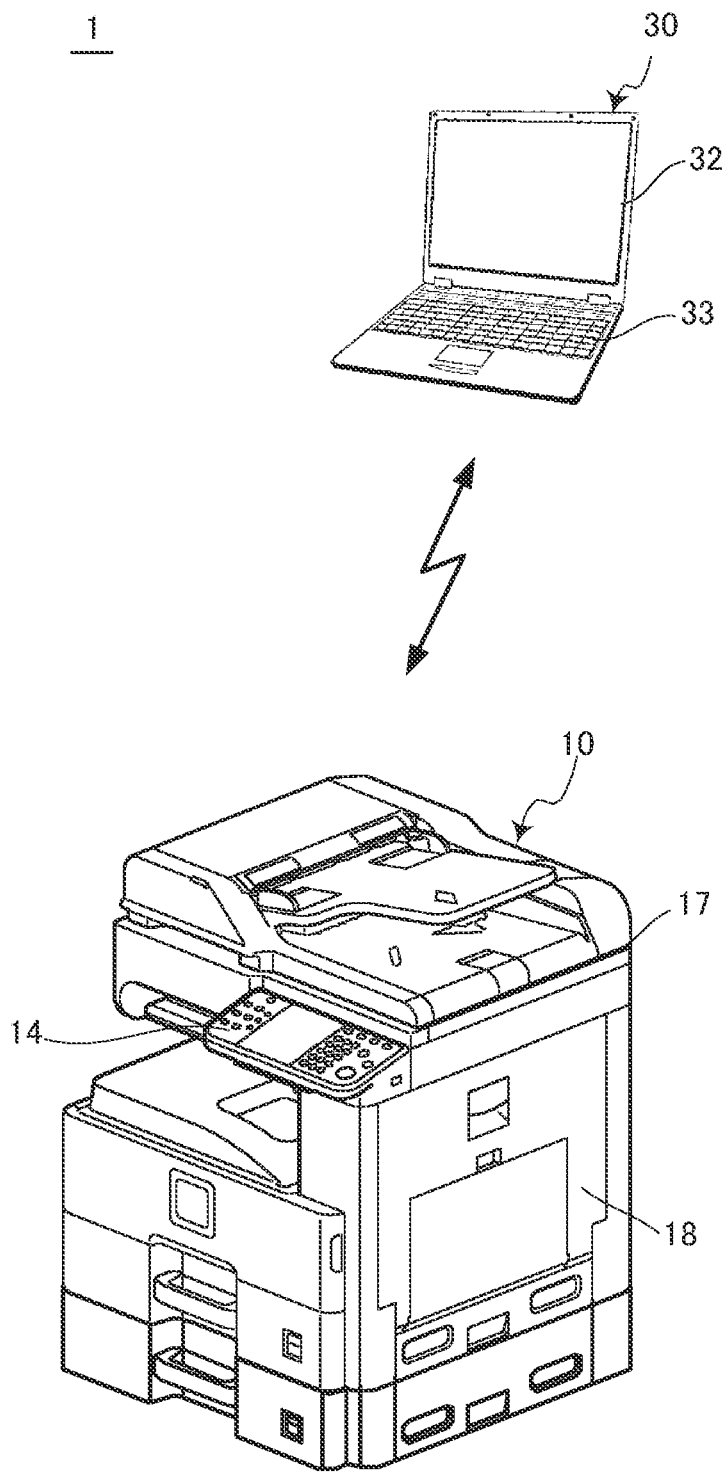
FIG. 1 is a perspective view showing the appearance of an image forming apparatus and an information processing apparatus, in a communication system according to a first embodiment of the disclosure.
Figure 2:
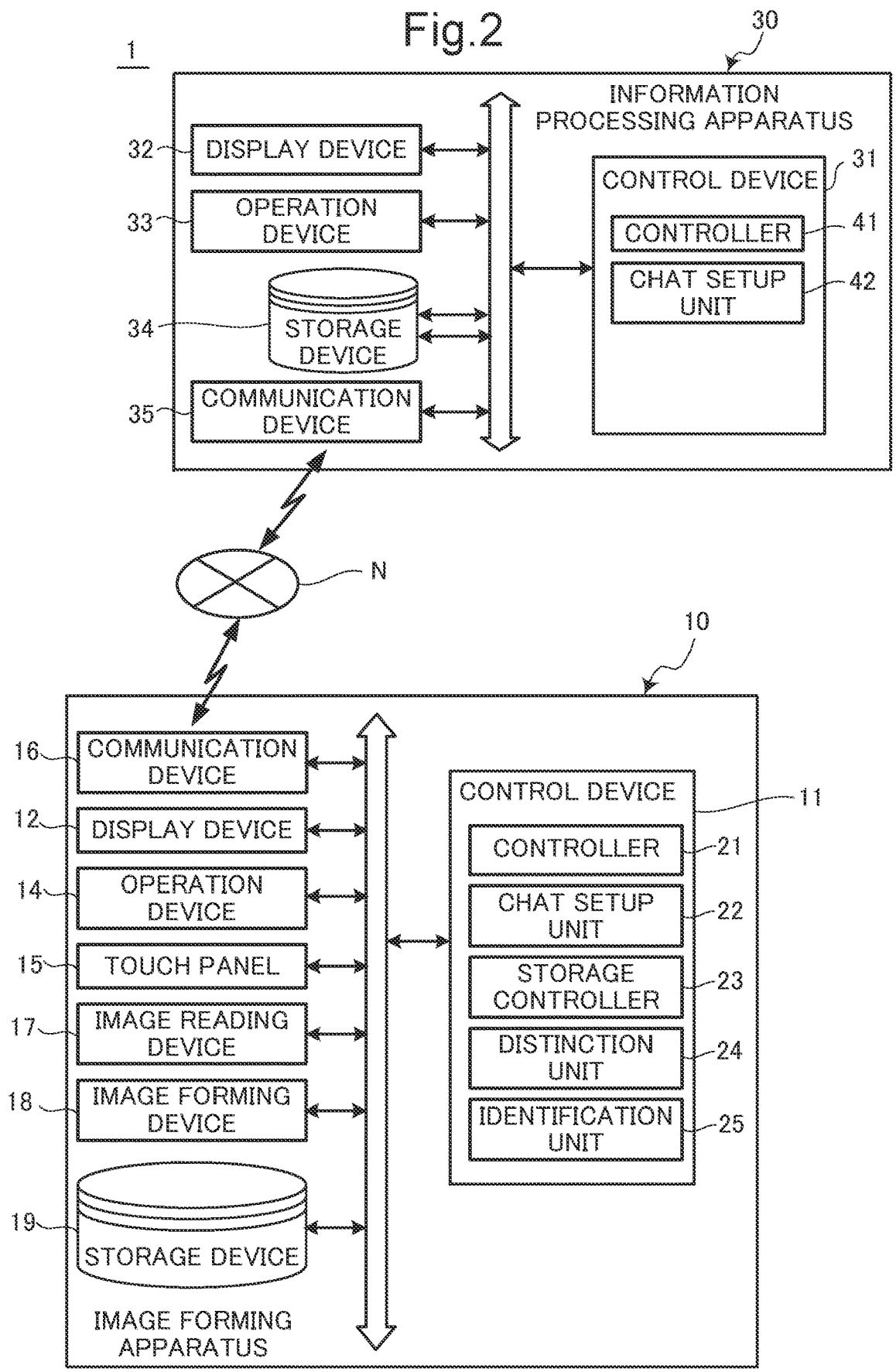
FIG. 2 is a block diagram showing a configuration of the image forming apparatus and the information processing apparatus, in the communication system according to the first embodiment.

FIG. 1 is a perspective view showing the appearance of an image forming apparatus and an information processing apparatus, in the communication system according to a first embodiment of the disclosure. FIG. 2 is a block diagram showing a configuration of the image forming apparatus and the information processing apparatus, in the communication system according to the first embodiment.

The communication system 1 according to the first embodiment includes the image forming apparatus 10 and the information processing apparatus 30, which perform data communication using a chat tool.

The information processing apparatus 30 is, for example, a personal computer, and includes a control device 31, a display device 32 (first display device), an operation device 33, and a communication device (first communication device) 35. The mentioned components are configured to transmit and receive data or signals to and from each other, via a bus.

The display device 32 is, for example, constituted of a liquid crystal display (LCD) or an organic light-emitting diode (OLED) display.

The operation device 33 includes input tools such as a keyboard and pointing device.

The communication device 35 is a communication interface including a communication module, and performs data communication through a network N including a LAN and the public telephone network.

The storage device 34 is a large-capacity storage device such as a hard disk drive (HDD).

The control device 31 includes a processor, a random-access memory (RAM), and a read-only memory (ROM). The processor is, for example, a central processing device (CPU), a micro processing device (MPU), or an application specific integrated circuit (ASIC). The control device 31 (first control device) acts as a controller 41 (first controller) and a chat setup unit 42 (first setup unit), when the processor executes a control program (e.g., first control program) stored in the storage device 34. Here, the mentioned components of the control device 31 may each be constituted in the form of a hardware circuit, instead of being realized by the operation according to the control program.

The controller 41 serves to control the overall operation of the information processing apparatus 30.

The controller 41 identifies a user operation inputted by the user through the operation device 33. The controller 41 then receives the user operation identified.

The controller 41 controls the display device 32 so as to display various types of windows, items necessary for information processing, texts, and so forth, on the screen of the display device 32.

The controller 41 is configured to control the communication performance of the communication device 35. For example, the communication device 35 transmits and receives data to and from the image forming apparatus 10 through a LAN, under the control of the controller 41.

When the operation device 33 receives a chat activating operation performed by the user, the controller 41 instructs the chat setup unit 42 to activate the chat tool.

Figure 5:
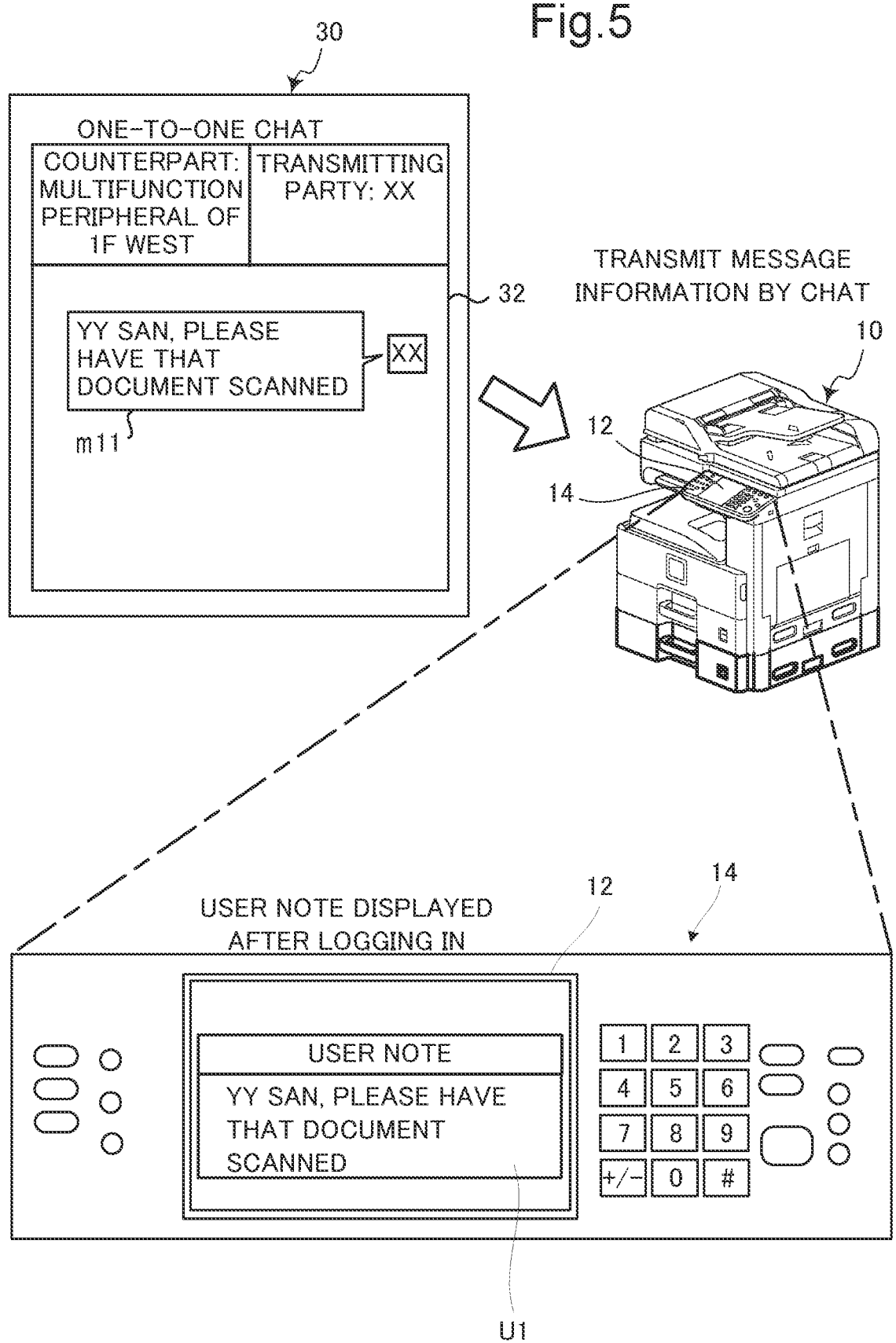
FIG. 5 is a schematic drawing showing an example of a user note display of message information, in the communication system according to the first embodiment.

The chat setup unit 42 establishes a chat IP communication function, by activating the chat tool, in other words executing a chat application program. Accordingly, a condition that enables the chat to be performed is established. The chat setup unit 42 causes the display device 32 to display a chat screen including the image forming apparatus 10 as a chat member, as shown in FIG. 5 to be subsequently referred to. The chat application program is installed in the storage device 34. The controller 41 transmits and receives data to and from a terminal device of the communication counterpart (in this embodiment, mainly the image forming apparatus 10) through the communication device 35, utilizing the chat IP communication function.

When message information is inputted to the chat screen through the operation device 33, the controller 41 causes the communication device 35 to transmit the message information to the image forming apparatus 10, through the network N.

The image forming apparatus 10 includes a control device 11, a display device 12 (second display device), an operation device 14, a touch panel 15, a communication device (second communication device) 16, an image reading device 17, an image forming device 18, and a storage device 19. The mentioned components are configured to transmit and receive data or signals to and from each other, via a bus.

The image reading device 17 includes a scanner that optically reads a source document, and generates image data representing the image of the source document.

The image forming device 18 uniformly charges the surface of a photoconductor drum, forms an electrostatic latent image on the surface of the photoconductor drum by exposing the same to light, develops the electrostatic latent image on the surface of the photoconductor drum into a toner image, transfers the toner image on the photoconductor drum to a recording sheet (recording medium), and fixes the image thereon. For example, the image forming device 18 can print, under the control of a controller 21, an image represented by print data received by the communication device 16 from the information processing apparatus 30 on the recording sheet, or print an image represented by the image data generated by the image reading device 17, on the recording sheet.

The display device 12 is, for example, constituted of a liquid crystal display or an organic light-emitting diode display.

A touch panel 15 is overlaid on the screen of the display device 12. The touch panel 15 is based on a resistive film or electrostatic capacitance, and configured to detect a contact (touch) of the user's finger, along with the touched position, and outputs a detection signal indicating the coordinate of the touched position, to the controller 21 of the control device 11 to be subsequently described. Thus, the touch panel 15 serves as an operation device for receiving an input made by the user through the screen of the display device 12.

The operation device 14 includes soft keys displayed on the screen of the display device 12, and hard keys located on the left and right of the screen of the display device 12. The hard keys include, for example, a menu key for displaying a menu, arrow keys for moving the focus in the GUI constituting the menu, an enter key for confirming a selection to the GUI constituting the menu, and a start key.

The communication device 16 is a communication interface including a communication module, and performs data communication through a network N including a LAN and the public telephone network.

The storage device 19 is a large-capacity storage device such as a HDD. The storage device 19 includes, as shown in FIG. 7 to be subsequently referred to, a user note storage region for storing the message information received from the information processing apparatus 30, as information for displaying the user note.

The control device 11 includes a processor, a RAM, and a ROM. The processor is, for example, a CPU, an MPU, or an ASIC. The control device 11 (second control device) acts as the controller 21 (second controller), a chat setup unit 22 (second setup unit), a storage controller 23, a distinction unit 24, and an identification unit 25, when the processor executes a control program (e.g., second control program) stored in the storage device 19. Here, the mentioned components of the control device 11 may each be constituted in the form of a hardware circuit, instead of being realized by the operation according to the control program.

The controller 21 serves to control the overall operation of the image forming apparatus 10.

The controller 21 receives a user operation performed on the touch panel 15, on the basis of a detection signal outputted from the touch panel 15. In other words, the controller 21 receives the user operation performed on the soft keys displayed on the screen of the display device 12. The controller 21 also receives the user operation performed on the hard keys of the operation device 14.

The controller 21 controls the display device 12, so as to display a screen for inputting setting details necessary for the image forming operation, and a screen for inputting various types of information.

The controller 21 is configured to control the communication performance of the communication device 16. For example, the communication device 16 transmits and receives data to and from the information processing apparatus 30 through a LAN, under the control of the controller 21.

The chat setup unit 22 establishes a chat IP communication function, by activating the chat tool, in other words executing the chat application program. Accordingly, a condition that enables the chat to be performed is established. Although the chat setup unit 22 restricts the display device 12 from displaying the chat screen, the chat screen may be displayed by pressing a non-illustrated display request button. The chat application program is installed in the storage device 19. The controller 21 transmits and receives data to and from a terminal device of the communication counterpart (e.g., information processing apparatus 30) through the communication device 16, utilizing the chat IP communication function.

The storage controller 23 stores, when the communication device 16 receives the message information from the information processing apparatus 30, the message information in the user note storage region of the storage device 19.

The controller 21 causes the display device 12 to display the message information stored in the user note storage region of the storage device 19.

The identification unit 25 analyzes the message information stored in the user note storage region of the storage device 19, thereby identifying a user included in the message information. The message information is text information including kanji, hiragana, katakana, alphabets, Arabic numerals. For example, distinction characters for identifying the user, contained in the message information, are stored in advance in the storage device 19. Examples of the distinction characters include honorific titles such as "San", "Sama (kanji)", "Dono", "Sama (hiragana)" "Kun", and "Chan", job titles such as "Chief", "Manager", and "Director", and English honorific titles such as "Mr.", "Ms.", and "Mrs.". The identification unit 25 detects whether the distinction character is included in the message information, and identifies the word before or after the distinction character as a user name, when the distinction character is found in the message information. When the language used for the message information is predominantly composed of kanji, hiragana, and katakana, the identification unit 25 detects the distinction character, and identifies the word before the distinction character as a user name, when the distinction character is found. When the language used for the message information is predominantly composed of alphabets, the identification unit 25 detects the distinction character, and identifies the word after the distinction character as a user name, when the distinction character is found. For example, the identification unit 25 performs pattern matching in Japanese with respect to the message information, and calculates a recognition rate of Japanese. Then the identification unit 25 performs pattern matching in English with respect to the message information, calculates a recognition rate of English, and identifies that the language the recognition rate of which is higher is used for the message information. Alternatively, the identification unit 25 may utilize a known language type identification program, to identify the language. Further, the identification unit 25 may utilize a known name identification program, to identify a user name.

The storage controller 23 stores the message information from the information processing apparatus 30 and the user identified by the identification unit 25, in the user note storage region of the storage device 19, in association with each other. The controller 21 causes the display device 12, when the user who has logged in in the image forming apparatus 10 accords with the user identified by the identification unit 25, to display the message information stored in the user note storage region in association with the user identified by the identification unit 25.

When the controller 21 causes the display device 12 to display the message information, the storage controller 23 stores already-read information (turn on an already-read flag to be subsequently described), indicating that the user identified by the identification unit 25 has read the message information, in the storage device 19. The controller 21 restricts the display device 12 from displaying the message information, when the already-read information is stored in the storage device 19 (when the already-read flag is ON), despite the user who has logged in in the image forming apparatus 10 according with the user identified by the identification unit 25.

After the controller 21 causes the display device 12 to display the message information, the storage controller 23 deletes the message information and the already-read information, from the user note storage region.

The distinction unit 24 decides whether the chat setup unit 22 has established a one-to-one chat between the information processing apparatus 30 and the image forming apparatus 10, or a group chat among the information processing apparatus 30, the image forming apparatus 10, and another information processing apparatus.

For example, in an upper-end space of the chat screen shown in FIG. 5, the chat members participating in the chat are displayed. In the upper-end space of FIG. 5, the communication counterpart is displayed as "Multifunction Peripheral of 1F West", and the transmitting party is displayed as a user named "XX". The image forming apparatus 10 shown in FIG. 1 and FIG. 2 corresponds to the multifunction peripheral named as "Multifunction Peripheral of 1F West". The information processing apparatus 30 shown in FIG. 1 and FIG. 2 corresponds to the personal computer used by the user called "XX". Here, the information processing apparatus 30 and the image forming apparatus 10 may each be displayed in the form of an icon representing the apparatus. The distinction unit 24 distinguishes between the one-to-one chat and the group chat, according to the relation between the chat members displayed on the chat screen. More specifically, the distinction unit 24 decides that the one-to-one chat is being performed, when one communication counterpart and one transmitting party are displayed in the upper-end space of the chat screen, and that the group chat is being performed, when two or more communication counterparts and one transmitting party are displayed.

The controller 21 causes the display device 12 to display the message information stored in the user note storage region, when the distinction unit 24 decides that the group chat is being performed, and the user who has logged in in the image forming apparatus 10 accords with the user of the group chat.

When the controller 21 causes the display device 12 to display the message information, the storage controller 23 stores information of user who already read, indicating that the user of the group chat who has logged in in the image forming apparatus 10 has read the message information, in the storage device 19. The controller 21 restricts the display device 12 from displaying the message information, when the user who has logged in in the image forming apparatus 10 accords with the user indicated by the information of user who already read, stored in the storage device 19.

After the controller 21 causes the display device 12 to display the message information, the storage controller 23 deletes the message information and the information of user who already read, from the user note storage region.

When the distinction unit 24 decides that the one-to-one chat is being performed, and the identification unit 25 fails to identify the user, the controller 21 causes the display device 12 to display the message information stored in the user note storage region, to all the users who have logged in in the image forming apparatus 10.

Between the image forming apparatus 10 and the information processing apparatus 30, the message information is transmitted from the information processing apparatus 30 to the image forming apparatus 10, using a communication function such as an internet phone service based on the P2P technique, or a social network service. In this embodiment, such communication function will be referred to as IP communication function. An example of the IP communication function is the known Skype (registered trademark). In the case of the Skype, apparatus identification information (e.g., ID and password) for identifying the apparatus is registered with respect to each of the image forming apparatus 10 and the information processing apparatus 30, so that the chat, phone call, image data transmission can be performed among the image forming apparatus 10 and a plurality of information processing apparatuses 30, provided that the Skype is activated in the apparatus.

Figure 3:
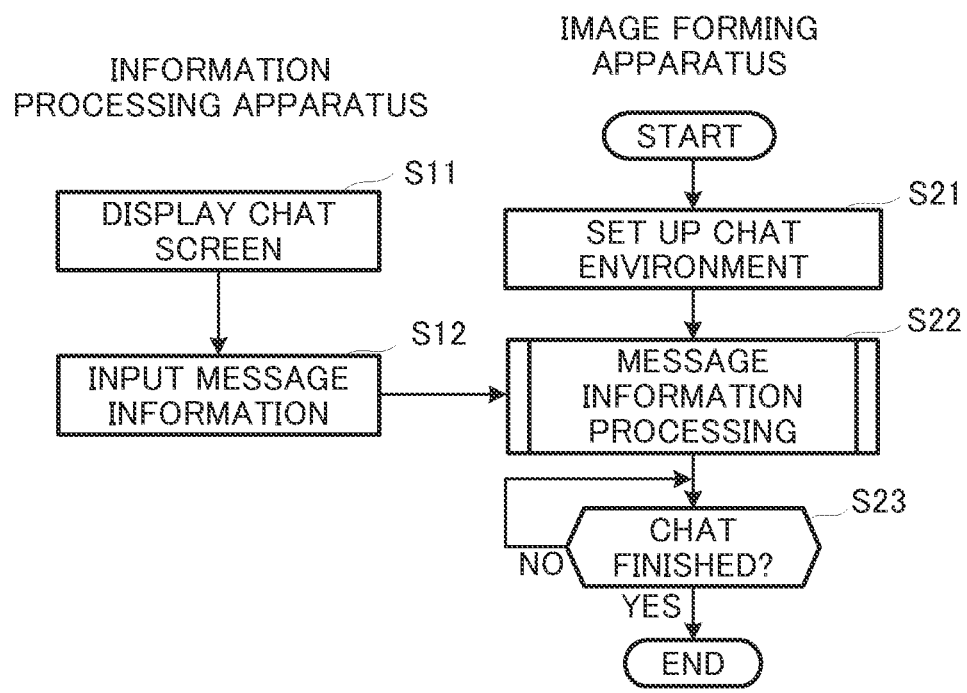
FIG. 3 is a flowchart showing a processing based on a chat function, in the communication system according to the first embodiment.
Figure 4:
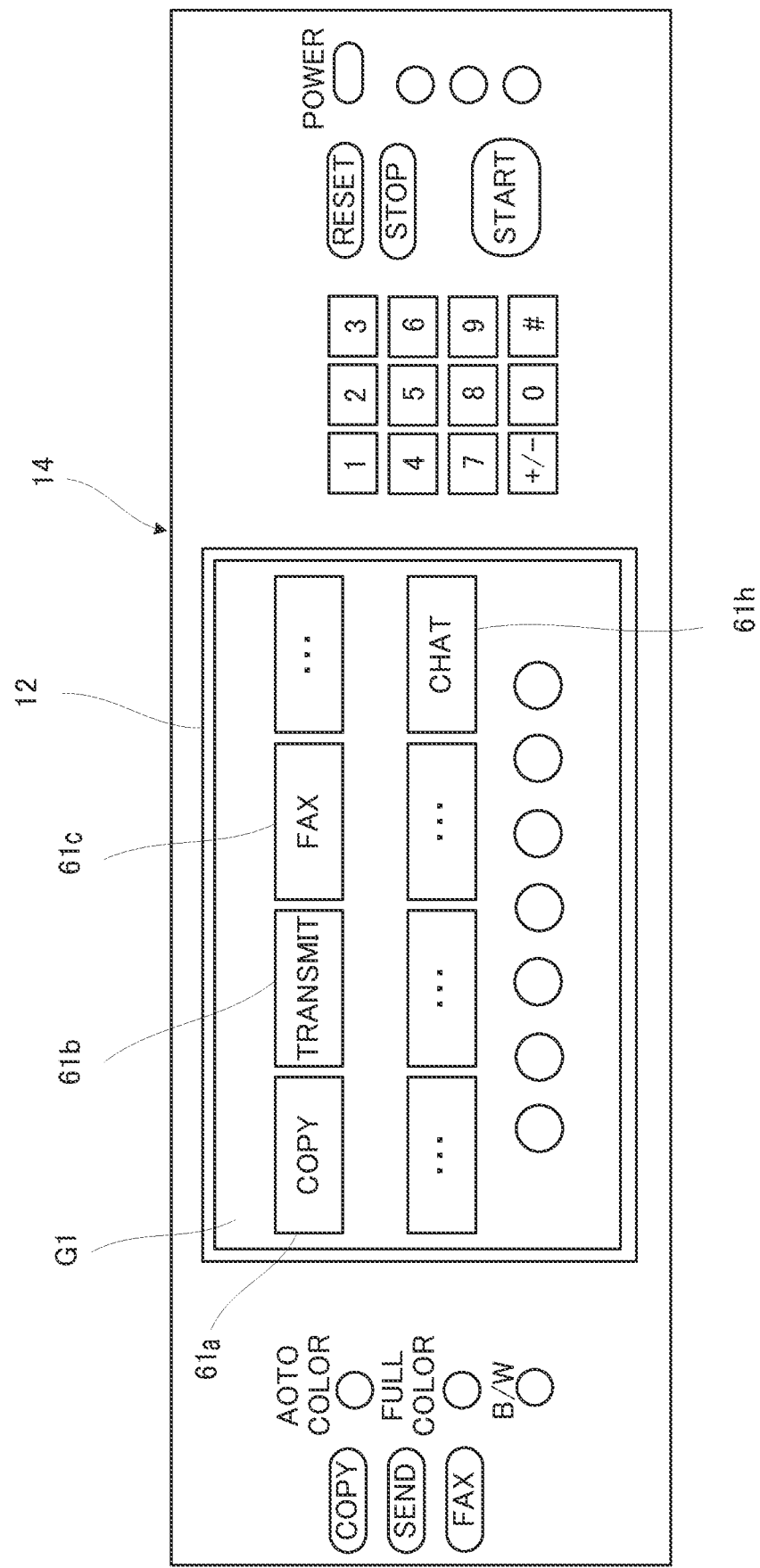
FIG. 4 is a plan view showing an operation device and a display device of the image forming apparatus.

Referring now to FIG. 3 to FIG. 5, an operation based on the chat function, performed in the communication system 1 according to the first embodiment, will be described hereunder. FIG. 3 is a flowchart showing the operation based on the chat function, in the communication system according to the first embodiment. FIG. 4 is a plan view showing the operation device and the display device of the image forming apparatus. FIG. 5 is a schematic drawing showing an example of the user note display of the message information, in the communication system according to the first embodiment.

First, the chat setup unit 22 of the image forming apparatus 10 activates the chat tool, thereby activating the chat IP communication function (S21).

More specifically, the controller 21 causes the display device 12 in advance, to display a menu screen G1 shown in FIG. 4. The menu screen G1 includes a plurality of touch keys 61a to 61h, respectively corresponding to the functions of the image forming apparatus 10. When the user touches the touch key 61h corresponding to the chat, the touch operation made on the touch key 61h is detected through the touch panel 15, and received by the controller 21. The controller 21 instructs the chat setup unit 22 to activate the chat tool, so that the chat setup unit 22 activates the chat IP communication function (S21).

On the part of the information processing apparatus 30, the operation device 33 receives the activating operation of the chat, performed by the user. Accordingly, the controller 41 instructs the chat setup unit 42 to activate the chat tool, in response to the activating operation. The chat setup unit 42 activates the chat IP communication function according to the instruction of the controller 41, and causes the display device 32 to display the chat screen shown in FIG. 5 (S11).

When the user inputs message information m11 in the chat screen of the display device 32 in the information processing apparatus 30, as shown in FIG. 5 (S12), the controller 41 of the information processing apparatus 30 causes the communication device 35 to transmit the message information m11 to the image forming apparatus 10, via the network N. It is assumed here that the message information m11 is text information written as "YY San, please have that document scanned", as shown in FIG. 5.

Upon receipt of the message information from the information processing apparatus 30, the communication device 16 of the image forming apparatus 10 performs message information processing (S22). Here, although the image forming apparatus 10 restricts the display device 12 from displaying the chat screen as described above, the display containing the message information m11 appears on the chat screen by means of the chat function, when the non-illustrated display request button is pressed to allow the display device 12 to display the chat screen.

Figure 6:
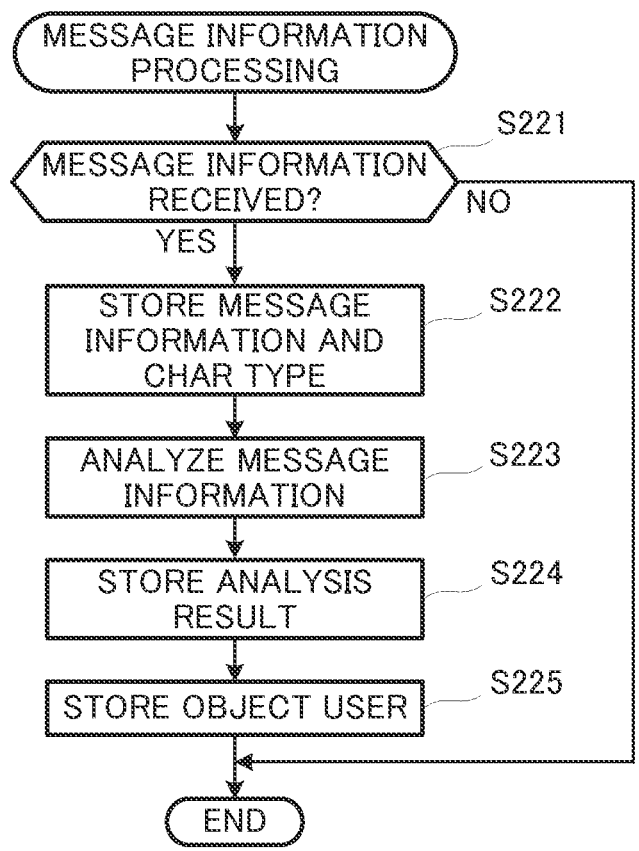
FIG. 6 is a flowchart showing a message information processing, in the communication system according to the first embodiment.

The message information processing will be described hereunder, with reference to FIG. 6 and FIG. 7. FIG. 6 is a flowchart showing the message information processing, in the communication system according to the first embodiment. FIG. 7 shows an example of data stored in the user note storage region.

When the communication device 16 receives the message information from the information processing apparatus 30 (YES at S221), the storage controller 23 of the image forming apparatus 10 stores the message information m11 and the chat type in the user note storage region of the storage device 19 (S222). The storage controller 23 stores the message information m11, "YY San, please have that document scanned", for example in a message information field at a storage address "AD0001" in the user note storage region of the storage device 19, as shown in FIG. 7.

The distinction unit 24 decides that the one-to-one chat is being performed, because one communication counterpart and one transmitting party are displayed in the upper-end space of the chat screen shown in FIG. 5. The storage controller 23 stores the one-to-one chat decided by the distinction unit 24, as the chat type, and the user "XX" who is the transmitting party, as the chat member, for example in a chat type field at the storage address "AD0001" (S222).

The identification unit 25 analyzes the message information m11 stored in the user note storage region of the storage device 19, and identifies the user included in the message information m11 (S223). More specifically, the identification unit 25 decides that the language used in the message information m11 "YY San, please have that document scanned" is predominantly composed of kanji, hiragana, and katakana, and detects whether a distinction character (e.g., "San") is contained in the message information m11. Since the message information m11 contains "San", the identification unit 25 detects the distinction character (i.e., "San") in the message information m11, and identifies the name "YY" located right before the distinction character (i.e., "San"), as the user.

The storage controller 23 stores the analysis result of the message information m11 provided by the identification unit 25, in other words the user name "YY", in an identified user information field at the storage address "AD0001" in the user note storage region of the storage device 19, as shown in FIG. 7 (S224).

The storage controller 23 also stores the user name "YY" identified by the identification unit 25 from the message information m11, in an object user information field at the storage address "AD0001" in the user note storage region of the storage device 19 shown in FIG. 7 (S225). The "object user" refers to the user to whom the user note display is to be presented. At this point, the storage controller 23 sets an already-read flag with respect to each object user, at the storage address "AD0001" in the user note storage region of the storage device 19 shown in FIG. 7, to OFF. This is because the user note display has not been presented to the object user.

After S225, the controller 21 finishes the message information processing. Referring again to FIG. 3, the controller 21 of the image forming apparatus 10 decides whether the chat has finished (S23), and finishes the processing when, for example, the user instructs the image forming apparatus 10 to finish the chat (YES at S23). In the case where the chat is not finished yet (NO at S23), the chat is continued.

Figure 8:
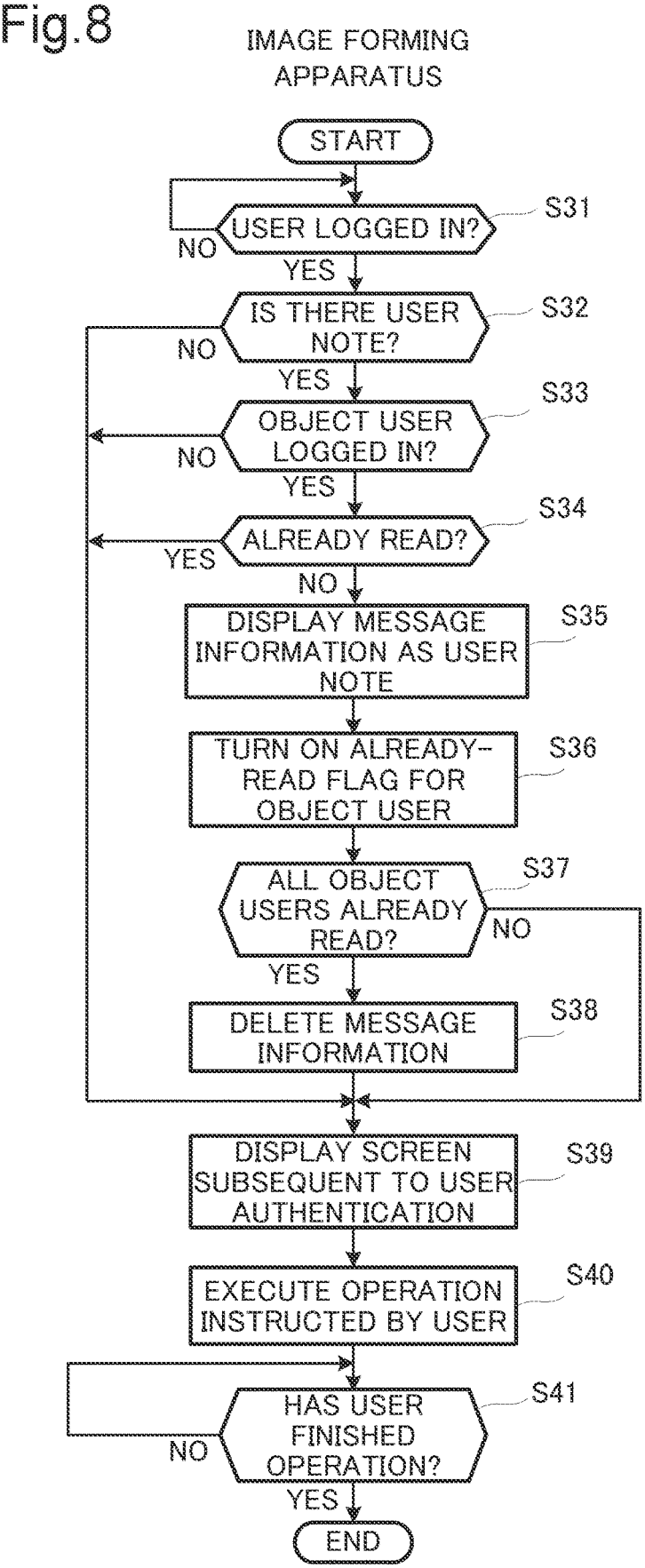
FIG. 8 is a flowchart showing a user note displaying processing performed after logging in, in the image forming apparatus.

Referring now to FIG. 8, a post-log-in user note displaying processing in the image forming apparatus 10 will be described hereunder. FIG. 8 is a flowchart showing the post-log-in user note displaying processing, in the image forming apparatus.

Figures 9A, 9B:
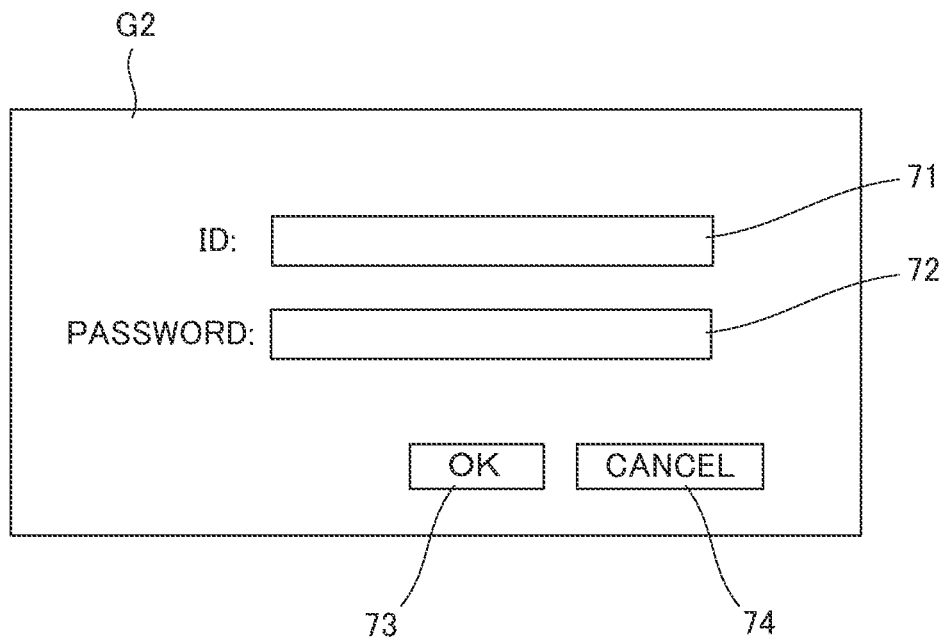
FIG. 9A is a schematic drawing showing an example of a log-in screen displayed on the display device of the image forming apparatus.
FIG. 9B shows an example of a user authentication table.

The controller 21 of the image forming apparatus 10 decides whether a user has logged in (S31). More specifically, in the case where a detection signal, outputted from the touch panel 15 when the user touches the screen of the display device 12, is inputted, or a signal indicating that one of the hard keys of the operation device 14 has been pressed is inputted, the controller 21 of the image forming apparatus 10 causes the display device 12 to display a log-in screen G2 shown in FIG. 9A. FIG. 9A illustrates an example of the log-in screen displayed on the display device of the image forming apparatus.

The log-in screen G2 includes two input columns 71 and 72 for respectively inputting the user ID and password, an OK key 73, and a cancel key 74. When the user fills in the input columns 71 and 72 with the ID and password, and touches the OK key 73, the controller 21 receives the ID and password of the user. In the storage device 19, a user authentication table, including the user names and the corresponding IDs and passwords, is registered in advance, as shown in FIG. 9B. FIG. 9B illustrates an example of the user authentication table.

The controller 21 authenticates whether the inputted ID and password of the user accord with the ID and password in the user authentication table shown in FIG. 9B, and permits the user to log in in the image forming apparatus 10, when the authentication is established (YES at S31). In this example, it is assumed that the user named "YY Jiro" shown in FIG. 9B has successfully been authenticated and has logged in (YES at S31).

When the user is authenticated (YES at S31), the storage controller 23 decides whether a user note exists (S32). More specifically, when the message information is stored in the user note storage region shown in FIG. 7, the storage controller 23 decides that the user note exists (YES at S32). Since the message information m11 "YY San, please have that document scanned" is stored in the user note storage region shown in FIG. 7, the storage controller 23 decides that the user note exists (YES at S32). In the case where no message information is stored in the user note storage region shown in FIG. 7, the storage controller 23 decides that there is no user note (NO at S32).

The controller 21 then decides whether the object user has logged in (S33). More specifically, when the object user stored in the user note storage region shown in FIG. 7 accords with the user who has logged in this time, identified according to the user authentication table shown in FIG. 9B, the controller 21 decides that the object user has logged in (YES at S33), but that it is not the object user who has logged in, in case of discordance (NO at S33).

When the controller 21 decides that the object user has logged in (YES at S33), the storage controller 23 decides whether the user note has already been read (S34). More specifically, the storage controller 23 decides that the user note has already been read when the already-read flag is ON (YES at S34), and decides that the user note has not been read yet, when the already-read flag is OFF (NO at S34). In this example, since the already-read flag accompanying the message information "YY San, please have that document scanned", stored at the storage address "AD0001" in the user note storage region shown in FIG. 7, is OFF, the storage controller 23 decides that the user note has not been read yet (NO at S34). Accordingly, the user note "YY San, please have that document scanned" is not displayed on the display device 12 of the image forming apparatus 10.

When the storage controller 23 decides that the user note has not been read yet (NO at S34), the controller 21 causes the display device 12 to display the user note indicating the message information (S35). As shown in FIG. 5, the controller 21 causes the display device 12 to display the user note U1 indicating the message information "YY San, please have that document scanned".

Then the storage controller 23 turns ON the already-read flag with respect to the object user (S36). The storage controller 23 turns ON the already-read flag corresponding to the message information "YY San, please have that document scanned", stored at the storage address "AD0001" in the user note storage region shown in FIG. 7.

The storage controller 23 then decides whether all the object users have already read the user note (S37). In this example, the object user, stored at the storage address "AD0001" in the user note storage region shown in FIG. 7, is "YY" alone, and the already-read flag for the user "YY" is ON. Therefore, the storage controller 23 decides that all the object users have already read the user note (YES at S37). In contrast, when a single object user is present, and the already-read flag for the single object user is OFF, or when a plurality of object users are present and the already-read flag for at least one of the object users is OFF, the storage controller 23 decides that all the object users have not read the user note yet (NO at S37).

Thereafter, the storage controller 23 deletes the message information displayed as the user note, from the user note storage region shown in FIG. 7 (S38). More specifically, the storage controller 23 deletes the entire content stored at the storage address "AD0001" in the user note storage region shown in FIG. 7, namely the message information, the chat type, the identified user, the object user, and the already-read flag.

After S38, the controller 21 displays an input screen subsequent to the user authentication (e.g., menu screen G1 shown in FIG. 4, or input screen exclusively for identified user) (S39), in the case of NO at S32, NO at S33, YES at S34, or NO at S37.

The controller 21 then executes the operation instructed by the user (e.g., copying, scanning, FAX transmission) through the input screen subsequent to the user authentication (e.g., menu screen G1 shown in FIG. 4, or input screen exclusively for identified user) (S40).

The controller 21 decides whether the user has finished the operation (S41). For example, when the user logs off, or when no inputs have been made for a predetermined period, the controller 21 decides that the user has finished the operation (YES at S41), and finishes the process. In the case where the period during which no inputs have been made is still shorter than the predetermined period, or where the user has not logged off (NO at S41), the controller 21 stands by for the predetermined period to be reached.

With the communication system 1 according to the first embodiment, the storage controller 23 of the image forming apparatus 10 stores the message information from the information processing apparatus 10 in the user note storage region of the storage device 19, and the controller 21 of the image forming apparatus 10 causes the display device 12 to display the message information stored in the user note storage region, as the user note display, by a simple operation of inputting the message information in the chat screen of the information processing apparatus 30, through the operation device 33. Therefore, the chat function and the user note function can be linked with each other. In addition, the message information stored in the user note storage region can be displayed on the display device 12 of the image forming apparatus 10, thus to be presented to the user who comes up to the image forming apparatus 10 to use the same, and therefore the user note function can be utilized as the information transmission tool for the user.

Now, the known device management system described earlier as background art utilizes the user note function of the image forming apparatus only to display a message from the remote maintenance server, and is unable to display a message from the information processing apparatus of the user who utilizes the image forming apparatus, using the user note function of the image forming apparatus. In other words, the user note function is unable to be utilized as the information transmission tool for the user.

In addition, whereas the linkage between the chat function and the user note function may lead to improved information transmission performance and operability, the known device management system is unable to realize the linkage between the chat function and the user note function.

In contrast, the arrangement according to the foregoing embodiment realizes the linkage between the chat function and the user note function, and enables the user note function to serve as the information transmission tool for the user.

In addition, the identification unit 25 of the image forming apparatus 10 analyzes the message information stored in the user note storage region, thereby identifying the user included in the message information. The storage controller 23 stores the message information from the information processing apparatus 30 and the user identified by the identification unit 25 in the user note storage region, in association with each other. The controller 21 causes the display device 12 to display the message information stored in the user note storage region, in association with the identified user, when the user who has logged in in the image forming apparatus 10 accords with the user identified by the identification unit 25. Accordingly, when the message information is directed to a specific user, the message information can only be displayed when the specific user has logged in in the image forming apparatus 10, and the message information is not displayed when a user other than the specific user has logged in in the image forming apparatus 10. Therefore, the message information can be surely delivered to the target person (specific user), simply by using the chat function. Such an arrangement eliminates the need to communicate with the specific user by a different transmission method such as an e-mail, thereby contributing to reducing the information transmission cost. Further, the message information can be displayed on the display device 12 of the image forming apparatus 10, only by the chat function. Therefore, the cost for the user to learn how to use the user note function can be saved, which leads to improved operability of the image forming apparatus 10.

When the controller 21 causes the display device 12 to display the message information, the storage controller 23 stores the already-read information (that the already-read flag is ON), indicating that the user identified by the identification unit 25 has already read the message information, in the storage device 19. When the already-read information is stored in the storage device 19 (already-read flag is ON), the controller 21 restricts the display device 12 from displaying the message information, despite that the user who has logged in in the image forming apparatus 10 accords with the user identified by the identification unit 25. In other words, when the specific user who already read the message information logs in again in the image forming apparatus 10, the message information that was already read is not displayed. Such an arrangement prevents the message information already read from being transmitted to the specific user in vain, thereby preventing the user from performing an erroneous operation because of repeatedly reading the message information that was already read.

Further, after the controller 21 causes the display device 12 to display the message information, the storage controller 23 deletes the message information and the already-read information stored in the user note storage region. The mentioned arrangement exempts the user from taking the trouble to delete the mentioned data, and allows the message information already read and the already-read information to be properly deleted from the user note storage region, thereby suppressing an increase in content stored in the user note storage region. This arrangement also prevents the message information already read from being transmitted to the specific user in vain, thereby preventing the user from performing an erroneous operation because of repeatedly reading the message information that was already read.

Figure 10A:
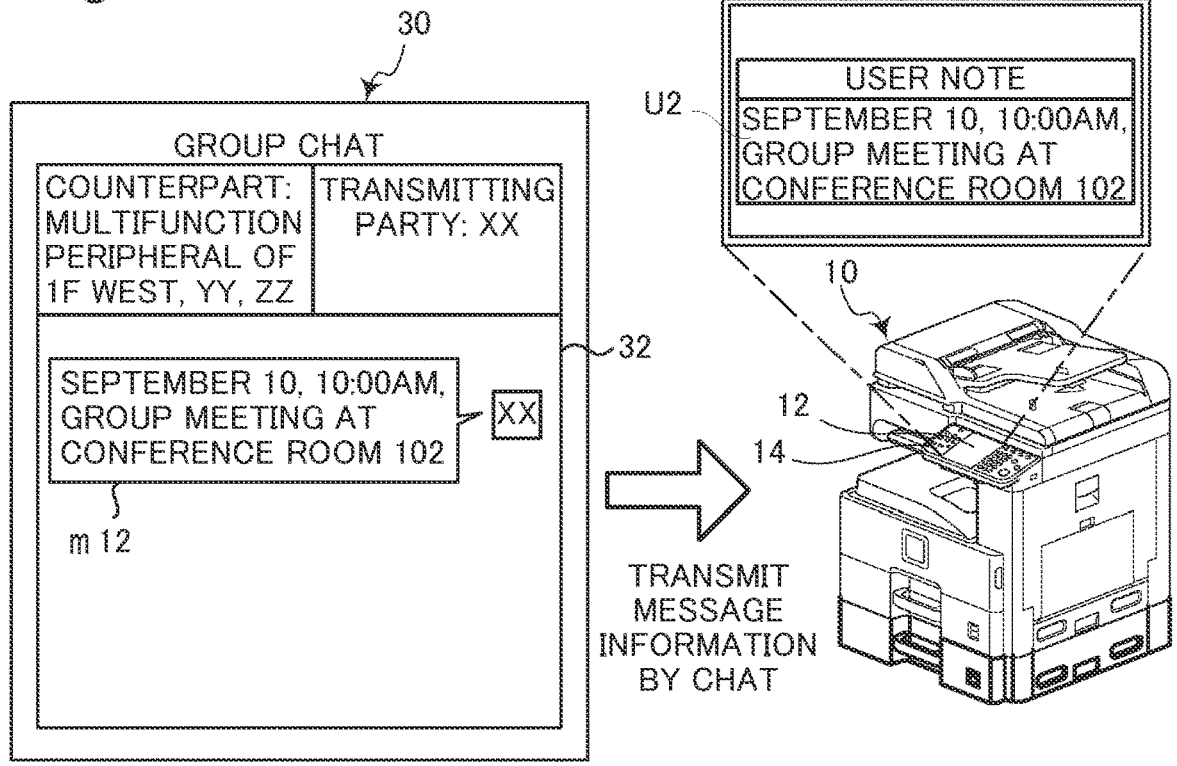
FIG. 10A is a schematic drawing showing an example of transmission of the message information on a group chat screen.

Hereunder, the case where message information m12 shown in FIG. 10A is inputted in the chat screen of the information processing apparatus 30 will be described. FIG. 10A illustrates the case where the message information is transmitted from the group chat screen. FIG. 11A illustrates an example of various types of data stored in the user note storage region.

Referring to FIG. 10A, for example, when the communication device 16 receives the message information m12 from the information processing apparatus 30 (YES at S221), the storage controller 23 of the image forming apparatus 10 stores the message information m12 and the chat type in the user note storage region of the storage device 19 (S222). More specifically, the storage controller 23 stores the message information m12, "September 10, 10:00 AM, group meeting at conference room 102", for example in the message information field at the storage address "AD0002" in the user note storage region of the storage device 19, as shown in FIG. 11A.

For example, the chat screen shown in FIG. 10A indicates, in the upper-end space thereof, that there are three communication counterparts, namely the "multifunction peripheral of 1F west", "YY", and "ZZ", and that the transmitting party is the user named "XX". Since two or more communication counterparts and one transmitting party are displayed in the upper-end space of the chat screen shown in FIG. 10A, the distinction unit 24 decides that the group chat is being performed. The storage controller 23 stores the "group chat" decided by the distinction unit 24, as the chat type, and also the user name "XX", who is the transmitting party, and the user names "YY" and "ZZ", as the chat member, for example in the chat type field at the storage address "AD0002" (S222).

The identification unit 25 analyzes the message information m12 stored in the user note storage region of the storage device 19, and identifies the user included in the message information m12 (S223). More specifically, the identification unit 25 decides that the language used in the message information m12, "September 10, 10:00 AM, group meeting at conference room 102", is predominantly composed of kanji, hiragana, and katakana, and detects whether a distinction character (e.g., honorific title such as "San" and "Sama") is contained in the message information m12. Since no distinction character is contained in the message information m12, the identification unit 25 does not detect a distinction character in the message information m12.

The storage controller 23 stores the analysis result provided by the identification unit 25 with respect to the message information m12, as "Unidentified" indicating that the identification unit 25 has identified no user in the message information m12, in the field of "User identified from message information" at the storage address "AD0002" in the user note storage region of the storage device 19 as shown in FIG. 11A (S224).

Since the identification unit 25 has not identified any user in the message information m12, the storage controller 23 stores the user names identified by the distinction unit 24 and displayed in the upper-end space of the chat screen shown in FIG. 10A (i.e., user names "XX", "YY", and "ZZ"), for example in the object user information field at the storage address "AD0002" in the user note storage region of the storage device 19 as shown in FIG. 11A (S225). The storage controller 23 then sets the already-read flag to OFF for each user, at the storage address "AD0002" in the user note storage region of the storage device 19 as shown in FIG. 11A. In this example, since the user note has been displayed to none of the object users, the already-read flag is set to OFF.

For example, when the user "YY", out of the users "XX", "YY", and "ZZ", comes up to the image forming apparatus 10 and logs in (YES at S31), the storage controller 23 decides that the user note is present (YES at S32), and that the already-read flag for the user "YY" is OFF (NO at S34). The controller 21 then causes the display device 12 to display the user note U2 indicating the message information "September 10, 10:00 AM, group meeting at conference room 102", as shown in FIG. 10A (S35). In view of the user note U2, the user "YY" recognizes the content of the message information. The storage controller 23 then sets the already-read flag for "YY", who is the object user, to ON (S36). Thereafter, the controller 21 restricts the display device 12 from displaying the user note U2, when the user "YY" logs in again in the image forming apparatus 10 (YES at S34). For the users "XX" and "ZZ" also, the controller 21 causes the display device 12 to display the user note U2 shown in FIG. 10A, only when the user logs in for the first time (S35).

The distinction unit 24 decides whether the second setup unit has established a one-to-one chat between the information processing apparatus 30 and the image forming apparatus 10, or a group chat among the information processing apparatus 30, the image forming apparatus 10, and another information processing apparatus. The controller 21 causes the display device 12 to display the message information stored in the user note storage region, when the distinction unit 24 decides that the group chat is being performed, and the user who has logged in in the image forming apparatus 10 accords with the user of the group chat. Accordingly, when the message information is directed to the user of the group chat, the message information can only be displayed when the user of the group chat has logged in in the image forming apparatus 10, and the message information is not displayed when a user other than the user of the group chat has logged in in the image forming apparatus 10. Therefore, the message information can be surely delivered to the target person (user of the group chat), simply by using the chat function. Such an arrangement eliminates the need to communicate with the user of the group chat by a different transmission method such as an e-mail, thereby contributing to reducing the information transmission cost. Further, the message information can be displayed on the display device 12 of the image forming apparatus 10, only by the chat function. Therefore, the cost for the user to learn how to use the user note function can be saved, which leads to improved operability of the image forming apparatus 10.

When the controller 21 causes the display device 12 to display the message information, the storage controller 23 stores the information of user who already read, indicating that the user of the group chat who has logged in in the image forming apparatus 10 has read the message information, in the storage device 19. When the user who has logged in in the image forming apparatus 10 accords with the user indicated by the information of user who already read stored in the storage device 19, the controller 21 restricts the display device 12 from displaying the message information. In other words, when the user who already read the message information, among the users of the group chat, logs in again in the image forming apparatus 10, the message information that was already read is not displayed. Such an arrangement prevents the message information already read from being transmitted to the specific user in vain, thereby preventing the user from performing an erroneous operation because of repeatedly reading the message information that was already read.

Further, after the controller 21 causes the display device 12 to display the message information, the storage controller 23 deletes the message information and the information of user who already read stored in the user note storage region. The mentioned arrangement exempts the user from taking the trouble to delete the mentioned data, and allows the message information already read and the information of user who already read to be properly deleted from the user note storage region, thereby suppressing an increase in content stored in the user note storage region. This arrangement also prevents the message information already read from being transmitted to the specific user in vain, thereby preventing the user from performing an erroneous operation because of repeatedly reading the message information that was already read.

Figure 10B:
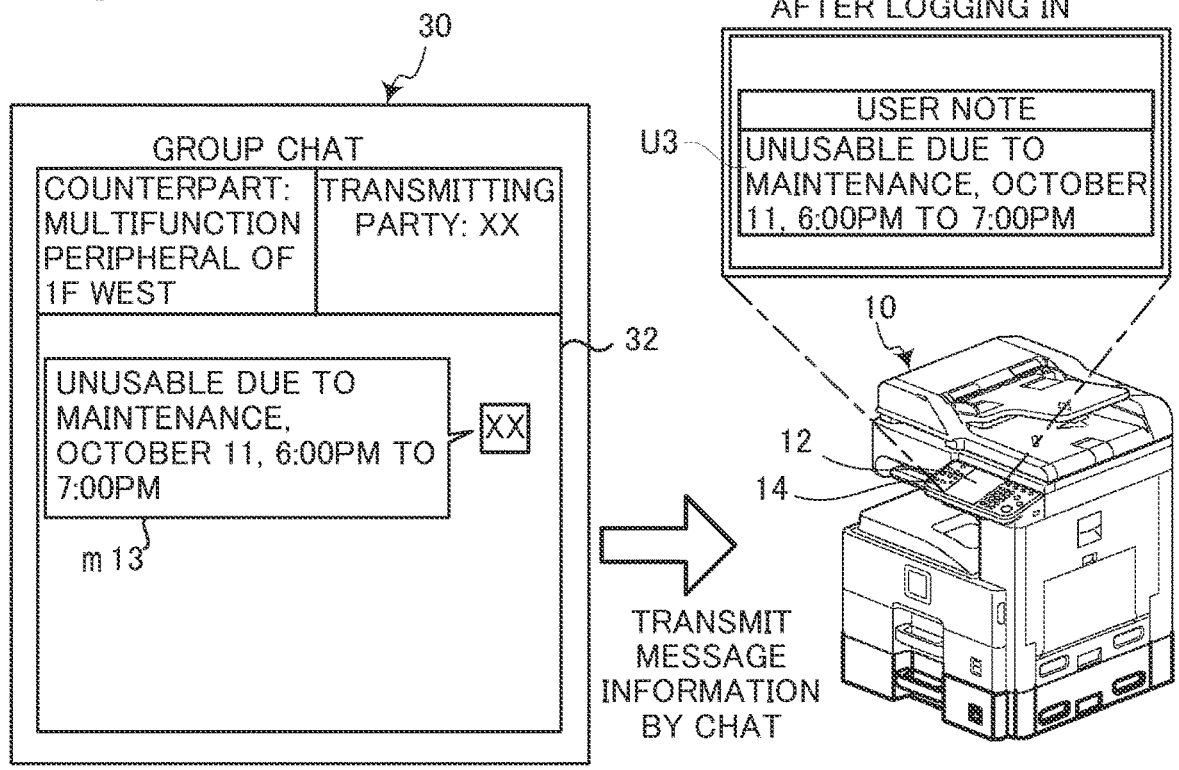
FIG. 10B is a schematic drawing showing an example of transmission of the message information on a one-to-one chat screen.

Hereunder, the case where message information m13 shown in FIG. 10B is inputted in the chat screen of the information processing apparatus 30 will be described. FIG. 10B illustrates the case where the message information is transmitted from the one-to-one chat screen. FIG. 11B illustrates an example of various types of data stored in the user note storage region.

Referring to FIG. 10B, for example, when the communication device 16 receives the message information m13 from the information processing apparatus 30 (YES at S221), the storage controller 23 of the image forming apparatus 10 stores the message information m13 and the chat type in the user note storage region of the storage device 19 (S222). More specifically, the storage controller 23 stores the message information m13, "Unusable due to maintenance, October 11, 6:00 PM to 7:00 PM", for example in the message information field at the storage address "AD0003" in the user note storage region of the storage device 19, as shown in FIG. 11B.

For example, the chat screen shown in FIG. 10B indicates, in the upper-end space thereof, that the communication counterpart is the "multifunction peripheral of 1F west", and that the transmitting party is the user named "XX". Since one communication counterpart and one transmitting party are displayed in the upper-end space of the chat screen shown in FIG. 10B, the distinction unit 24 decides that the one-to-one chat is being performed. The storage controller 23 stores the "one-to-one chat" decided by the distinction unit 24, as the chat type, and also the user name "XX", who is the transmitting party, for example in the chat type field at the storage address "AD0003" (S222).

The identification unit 25 analyzes the message information m13 stored in the user note storage region of the storage device 19, and identifies the user included in the message information m13 (S223). More specifically, the identification unit 25 decides that the language used in the message information m13, "Unusable due to maintenance, October 11, 6:00 PM to 7:00 PM", is predominantly composed of kanji, hiragana, and katakana, and detects whether a distinction character (e.g., honorific title such as "San" and "Sama") is contained in the message information m13. Since no distinction character is contained in the message information m13, the identification unit 25 does not detect a distinction character in the message information m13.

The storage controller 23 stores the analysis result provided by the identification unit 25 with respect to the message information m13, as "Unidentified" indicating that the identification unit 25 has identified no user in the message information m13, in the field of "User identified from message information" at the storage address "AD0003" in the user note storage region of the storage device 19 as shown in FIG. 11B (S224).

Since the identification unit 25 has not identified any user in the message information m13, and the distinction unit 24 has decided that the one-to-one chat is being performed, the storage controller 23 stores all the users, for example in the object user information field at the storage address "AD0003" in the user note storage region of the storage device 19 as shown in FIG. 11B (S225). The storage controller 23 then sets the already-read flag to OFF for each user, at the storage address "AD0003" in the user note storage region of the storage device 19 as shown in FIG. 11B. In this example, since the user note has been displayed to none of the object users, the already-read flag is set to OFF.

When one of the users comes up to the image forming apparatus 10 and logs in (YES at S31), the storage controller 23 decides that the user note is present (YES at S32), and that none of the object users have read the user note (NO at S34). The controller 21 then causes the display device 12 to display the user note U3 indicating the message information "Unusable due to maintenance, October 11, 6:00 PM to 7:00 PM", as shown in FIG. 10B (S35). In view of the user note U3, the user who has logged in recognizes the content of the message information. The storage controller 23 then sets the already-read flag for this user to ON (S36). Thereafter, the controller 21 restricts the display device 12 from displaying the user note U3, when this user logs in again in the image forming apparatus 10 (YES at S34). For other users also, the controller 21 causes the display device 12 to display the user note U3 shown in FIG. 10B, only when the user logs in for the first time (S35).

The identification unit of the image forming apparatus 10 analyzes the message information stored in the user note storage region, thereby identifying the user included in the message information. The distinction unit 24 decides whether the second setup unit has established a one-to-one chat between the information processing apparatus 30 and the image forming apparatus 10, or a group chat among the information processing apparatus 30, the image forming apparatus 10, and another information processing apparatus. The controller 21 causes the display device 12 to display the message information stored in the user note storage region, to all the users who have logged in in the image forming apparatus 10, when the distinction unit 24 decides that the one-to-one chat is being performed, and the identification unit 25 has not identified the user. Accordingly, when the message information is directed to all the users, the message information can be displayed to all the users who have logged in in the image forming apparatus 10. Therefore, the message information can be delivered to all the users, simply by using the chat function. Such an arrangement eliminates the need to communicate with all the users by a different transmission method such as an e-mail, thereby contributing to reducing the information transmission cost. Further, the message information can be displayed on the display device 12 of the image forming apparatus 10, only by the chat function. Therefore, the cost for the user to learn how to use the user note function can be saved, which leads to improved operability of the image forming apparatus 10.

Figure 13:
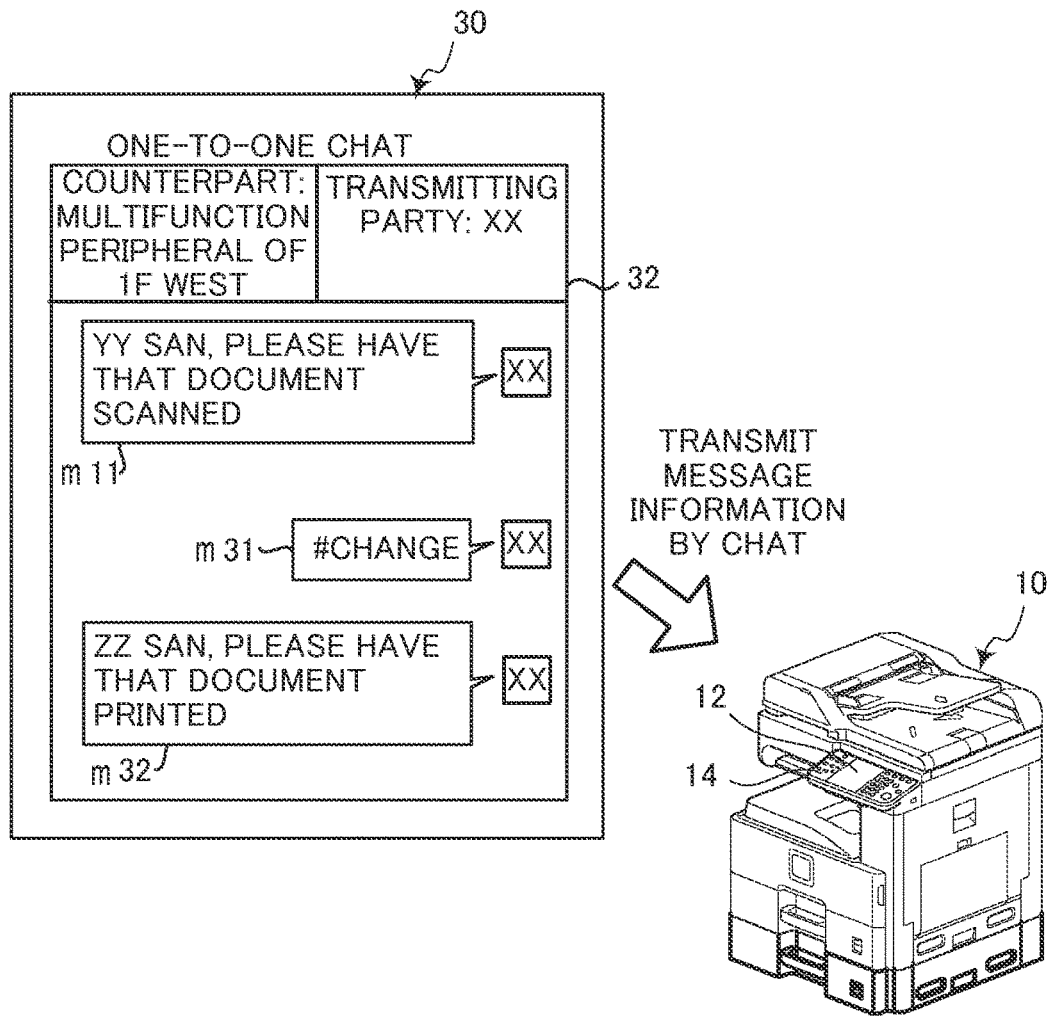
FIG. 13 is a schematic drawing showing an example of a case where a transmitting party instructs to change the message information on the chat screen, after transmitting the message information.

The communication system 1 according to a second embodiment will now be described hereunder. FIG. 12 illustrates the case where the transmitting party instructs to delete the message information on the chat screen, after transmitting the message information. FIG. 13 illustrates the case where the transmitting party instructs to change the message information on the chat screen, after transmitting the message information.

The communication system 1 according to the second embodiment is different from that of the first embodiment, in the function of the controller 21, the identification unit 25, and the storage device 19 of the image forming apparatus 10. More specifically, the message information stored in the user note storage region can be deleted or changed, with those components. In the following passage, the description of the same elements and operations as those of the first embodiment will not be repeated.

When an instruction message, including a special character (e.g., #) indicating that an instruction to the image forming apparatus 10 follows, an instruction character string ("Delete" in FIG. 12, "Change" in FIG. 13) following the special character and indicating the type of the instruction, and message information (message information m22 in FIG. 12, message information m32 in FIG. 13) following the instruction character string, is inputted in the chat screen through the operation device 33, the controller 41 of the information processing apparatus 30 causes the communication device 35 to transmit the inputted instruction message to the image forming apparatus 10 via the network N.

The identification unit 25 of the image forming apparatus 10 analyzes the message information received through the communication device 16, thereby identifying the special character, the instruction character string, and the message information included in the message information. In the example shown in FIG. 12, the identification unit 25 identifies the special character (for example "#") included in the message information m21, the instruction character string ("Delete") following the special character and indicating the detail of the instruction, and the message information m22.

In the storage device 19, a plurality of predetermined instruction terms, and the instruction details respectively indicated by the instruction terms are stored in association with each other. In the storage device 19, for example, the instruction term "Delete" and the "instruction to delete the message information" indicated by the instruction term are stored in association with each other, and the instruction term "Change" and the "instruction to change the message information" indicated by the instruction term are stored in association with each other.

Upon deciding that the instruction character string identified by the identification unit 25 accords with or includes one of the plurality of instruction terms stored in the storage device 19, the storage controller 23 executes an operation with respect to the memory of the message information, according to the instruction detail corresponding to the instruction term, according with or included in the instruction character string.

In the example shown in FIG. 12, more specifically, the identification unit 25 identifies the special character (for example "#") included in the message information m21, the instruction character string ("Delete") following the special character and indicating the detail of the instruction, and the message information m22, and deletes the message information m11, inputted earlier and having the same content as the message information m22, from the storage device 19.

In the example shown in FIG. 13, the identification unit 25 identifies the special character (for example"#") included in the message information m31, the instruction character string ("Change") following the special character and indicating the detail of the instruction, and the message information m32, changes the message information m11 inputted earlier to the message information m32, and stores the message information m32 in the storage device 19.

With the communication system 1 according to the second embodiment, the memory of the message information, displayed as the user note on the display device 12 of the image forming apparatus 10, can be deleted or changed, simply by using the chat function. Therefore, the operability of the image forming apparatus 10 can be further improved.

Although the image forming apparatus 10 and the information processing apparatus 30 activate the chat function in collaboration with each other in the foregoing embodiments, the management server may activate the chat function.

Further, the configurations and processings described in the foregoing embodiments with reference to FIG. 1 to FIG. 13 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A communication system comprising:
an image forming apparatus; and
an information processing apparatus, the image forming apparatus and the information processing apparatus being configured to perform data communication with each other,
wherein the information processing apparatus includes:
a first display device;
an operation device to be operated by a first user;
a first communication device that performs data communication; and
a first control device including a processor, and configured to act, when the processor executes a first control program, as:
a first setup unit that establishes a condition that enables chat to be performed, by activating a chat tool, and causes the first display device to display a chat screen including the image forming apparatus as a chat member; and
a first controller that causes the first communication device, when a message is inputted to the chat screen through the operation device, to transmit the inputted message to the image forming apparatus, via a network, and
the image forming apparatus includes:
a second display device;
a second communication device that performs data communication;
a storage device including a user note storage region; and
a second control device including a processor, and configured to act, when the processor executes a second control program, as:
a second setup unit that establishes a condition that enables the chat to be performed, by activating a chat tool;
a storage controller that stores, upon receipt of the message from the information processing apparatus through the second communication device, the message in the user note storage region; and
a second controller that causes the second display device to display the message stored in the user note storage region,
wherein the second control device further acts, when the processor executes the second control program, as an identification unit that analyzes texts included in the message stored in the user note storage region, and identifies a user name included in the message,
the storage controller stores, when the identification unit has identified the user name, the message from the information processing apparatus and the user name identified by the identification unit in the user note storage region, in association with each other, and
the second controller causes, when the user note storage region stores the message associated with the user name of a second user who has logged in the image forming apparatus, the second display device to display only the message.

2. The communication system according to claim 1, wherein, when the second controller causes the second display device to display the message, the storage controller stores already-read information in the storage device, in association with the displayed message, and
the second controller restricts the second display device from displaying the message, when the already-read information is stored in the storage device, despite the user note storage region stores the message associated with the user name of the second user.

3. The communication system according to claim 2, wherein the storage controller deletes, after the second controller causes the second display device to display the message, the message and the already-read information stored in the user note storage region.

4. The communication system according to claim 1, wherein the second control device further acts, when the processor executes the second control program, as a distinction unit that decides whether the second setup unit has established a one-to-one chat between the information processing apparatus and the image forming apparatus on one-to-one basis, or a group chat among the information processing apparatus, the image forming apparatus, and another information processing apparatus, and the second controller causes the second display device to display the message stored in the user note storage region, when the identification unit has not identified the user name, the distinction unit decides that the group chat is being performed, and the second user accords with the user of the group chat.

5. The communication system according to claim 4, wherein, when the second controller causes the second display device to display the message, the storage controller stores information of user who already read, indicating the user of the group chat, in the storage device, and the second controller restricts the second display device from displaying the message, when the second user accords with the user indicated by the information of user who already read stored in the storage device.

6. The communication system according to claim 5, wherein the storage controller deletes the message and the information of user who already read stored in the user note storage region, after the second controller causes the second display device to display the message.

7. The communication system according to claim 1, wherein the second control device further acts, when the processor executes the second control program, as:
a distinction unit that decides whether the second setup unit has established a one-to-one chat between the information processing apparatus and the image forming apparatus on one-to-one basis, or a group chat among the information processing apparatus, the image forming apparatus, and another information processing apparatus, and the second controller causes the second display device to display the message stored in the user note storage region, to all the second users who have logged in in the image forming apparatus, when the distinction unit decides that the one-to-one chat is being performed, and the identification unit has not identified the user name.

8. The communication system according to claim 1, wherein a distinction character to identify the user is stored in the storage device in advance, and the identification unit detects whether the distinction character is included in the texts, and identifies a word before or after the distinction character as the user name, when the distinction character is detected in the texts.

9. A communication system comprising:
an image forming apparatus; and
an information processing apparatus, the image forming apparatus and the information processing apparatus being configured to perform data communication with each other,
wherein the information processing apparatus includes:
a first display device;
an operation device to be operated by a user;
a first communication device that performs data communication; and
a first control device including a processor, and configured to act, when the processor executes a first control program, as:
a first setup unit that establishes a condition that enables chat to be performed, by activating a chat tool, and causes the first display device to display a chat screen including the image forming apparatus as a chat member; and
a first controller that causes the first communication device, when message information is inputted to the chat screen through the operation device, to transmit the inputted message information to the image forming apparatus, via a network, and
the image forming apparatus includes:
a second display device;
a second communication device that performs data communication;
a storage device including a user note storage region; and
a second control device including a processor, and configured to act, when the processor executes a second control program, as:
a second setup unit that establishes a condition that enables the chat to be performed, by activating a chat tool;
a storage controller that stores, upon receipt of the message information from the information processing apparatus through the second communication device, the message information in the user note storage region; and
a second controller that causes the second display device to display the message information stored in the user note storage region,
wherein the second control device further acts, when the processor executes the second control program, as an identification unit that analyzes the message information stored in the user note storage region, and identifies the user included in the message information,
wherein the first controller of the information processing apparatus causes the first communication device, when an instruction message, including a special character indicating that an instruction to the image forming apparatus is accompanying, an instruction character string following the special character and indicating detail of the instruction, and the message information following the instruction character string, is inputted in the chat screen through the operation device, to transmit the inputted instruction message to the image forming apparatus via the network,
the identification unit of the image forming apparatus analyzes the message information received by the second communication device, and identifies the special character, the instruction character string, and the message information included in the message information,
the storage device contains a plurality of predetermined instruction terms, and instruction details respectively indicated by the instruction terms, in association with each other, and
the storage controller executes, upon deciding that the instruction character string identified by the identification unit accords with or includes one of the plurality of instruction terms stored in the storage device, an operation with respect to memory of the message information, according to the instruction detail corresponding to the instruction term according with or included in the instruction character string.

* * * * *